United States Patent Office 3,016,155
Patented Jan. 9, 1962

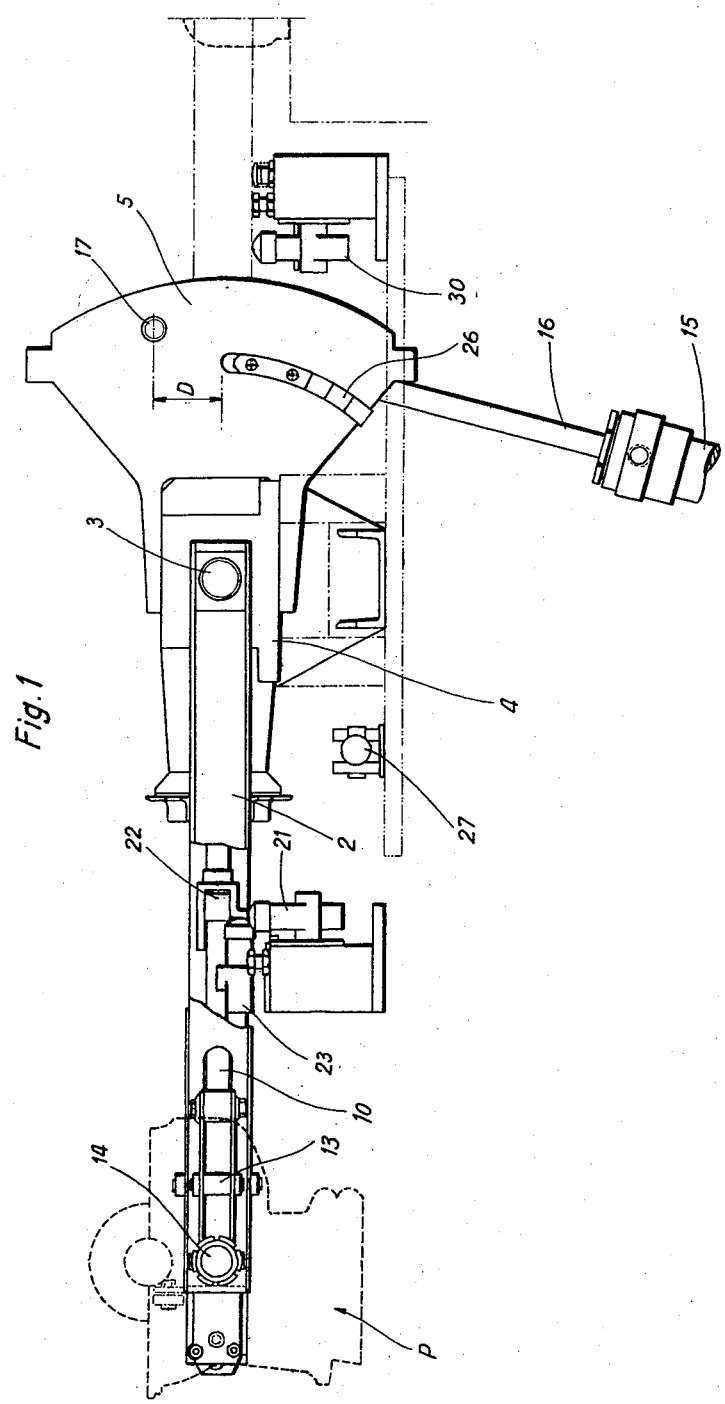

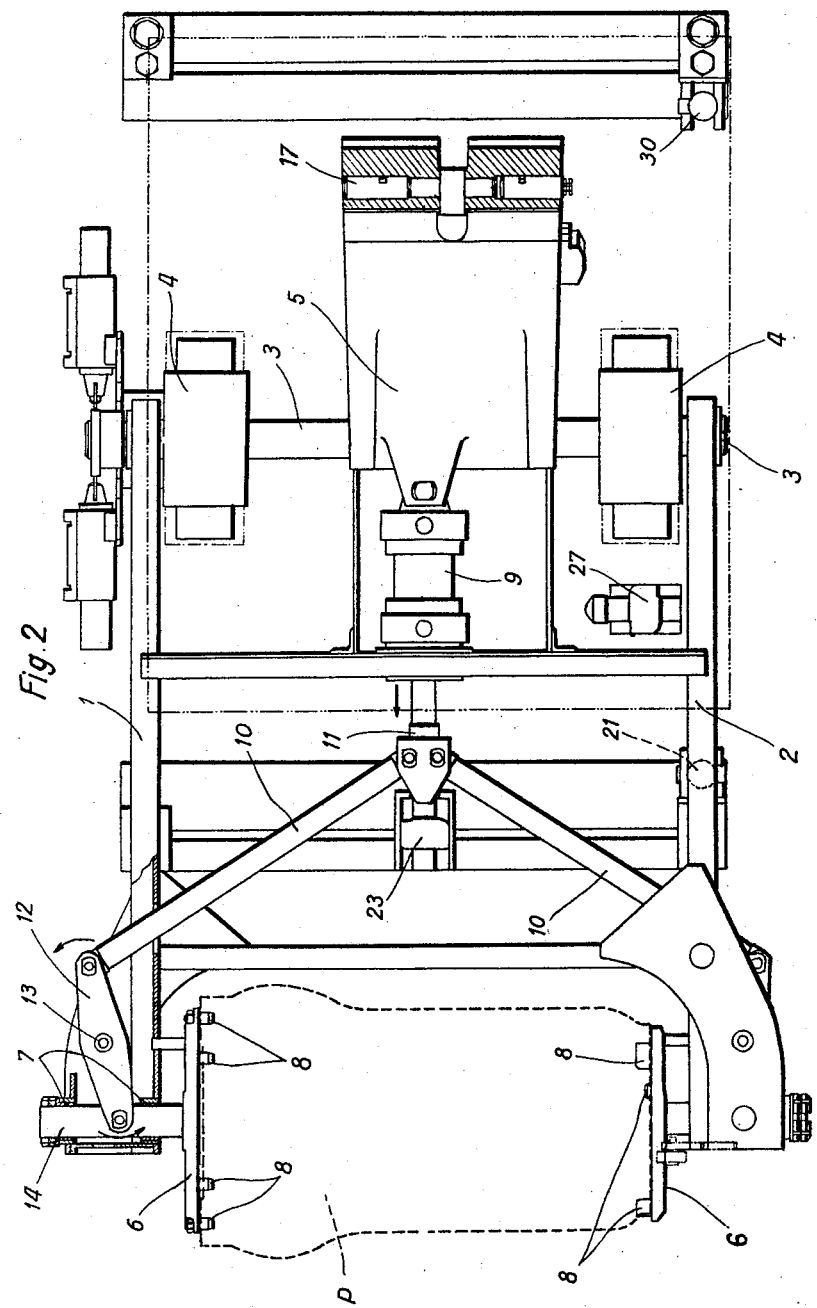

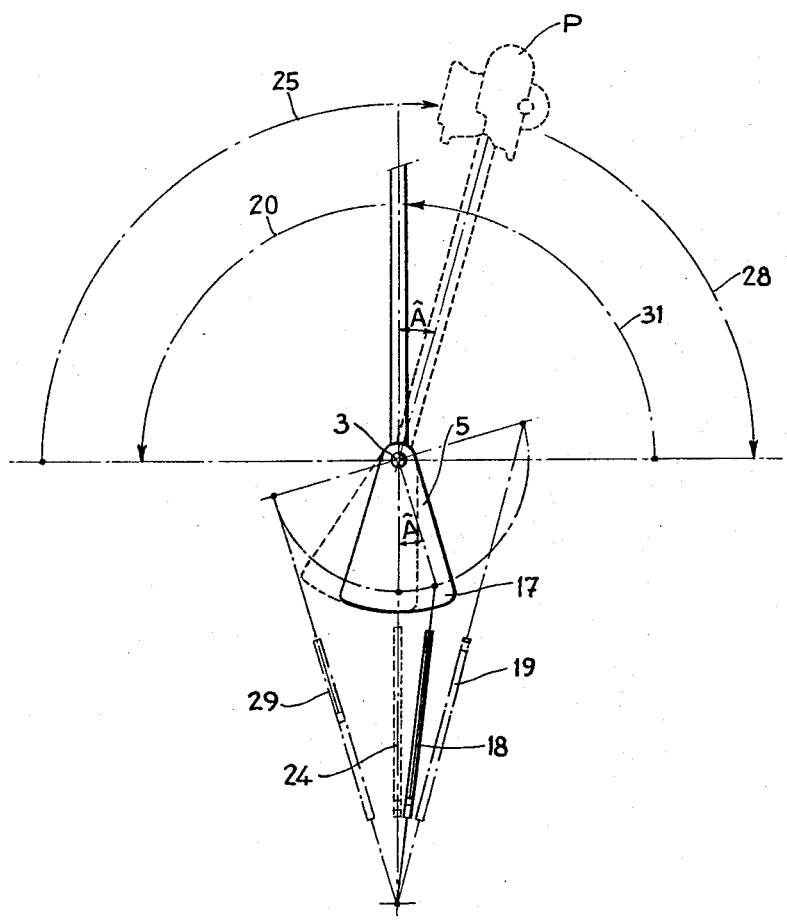

3,016,155
DEVICES FOR THE AUTOMATIC HANDLING AND TURNING-ROUND OF ARTICLES
Lucien Peras, Billancourt, France, assignor to Regie Nationale des Usines Renault, Billancourt, France
Filed July 2, 1957, Ser. No. 669,574
Claims priority, application France Aug. 8, 1956
5 Claims. (Cl. 214—147)

The invention relates to automatic handling devices and, amongst such devices, is concerned more particularly with a device whereby conveyed articles can be taken from a predetermined point and delivered to another place after turning the said articles around, for example between a conveyor and a machine, or vice versa.

This device comprises essentially an arm which is adapted to pivot through 180° about a horizontal axis and is adapted to grip the article and entrain it in its plane of pivoting, the invention being characterised principally in that the said arm is merely controlled by a jack connected to a counterweight of the said arm, the operational cycle of the device resulting from the appropriate combination of the point of application of the force supplied by the jack and the action of gravity, bringing into play the weight of the articles and of the counterweight.

The features of the invention will however be brought out more clearly from one form of embodiment of the device which will now be described by way of example, with reference to the automatic handling of cylinder blocks of motor-car engines during the course of machining operations.

In the accompanying drawings:
FIG. 1 is an elevational view of the device in the position of gripping a block;
FIG. 2 is a plan view of the device, in the position of FIG. 1;
FIG. 3 is a diagrammatic view showing the operational cycle of the device.

Referring to FIGS. 1 and 2, it will be seen that the handling arm is composed of two bars 1 and 2, which are rigidly connected together, and are fast with the horizontal pivot pin 3 of the arm, journalled in supports 4 on the device frame. The arm thus formed is capable of pivoting through 180° about the pin 3 and is normally urged into the vertical position under the action of a counterweight 5 which is fixed on the pin 3.

It carries at its end jaws 6 for gripping the blocks P, said jaws being slidably mounted in guide sleeves 7 of the bars 1 and 2 and being provided, at their faces which are directed towards one another, with studs 8 which are appropriately situated to engage in orifices in the block when the jaws come into contact with the latter.

The movement of these jaws is controlled from a jack 9 fixed on the arm-counterweight assembly, through the intermediary of a system of articulated rods. The rods 10 are articulated at one end to the movable member 11 of the jack and at the other end to rods 12 which are mounted so as to be rockable about a fixed pin 13 fast with the arm, the latter rods being also articulated to the sliding rods 14 of the jaws 6. It will be seen that the necessary amount of play is provided at the articulations of these rods to take into account the composition of the rectilinear and curvilinear movements.

The handling arm proper is connected to a driving jack 15 whose body is mounted in articulated fashion on a pin (not shown) of the frame, situated substantially plumb with the pivot pin 3 and enabling the said jack to rock in a plane parallel to the plane of pivoting of the handling arm.

Furthermore the movable member 16 of the said jack is articulated at 17 to the counterweight 5, the said point of articulation 17 being intentionally offset by an amount D relatively to the longitudinal axis of the arm, on which the centre of gravity of the arm-counterweight assembly is substantially situated in the vertical position of equilibrium.

Contact-makers are also provided for initiating the various phases of operation of the device, and their function will be mentioned in the description of the said operation, the diagram in FIG. 3 being provided in order to make this operation more readily understood.

In the position of readiness of the device, the handling arm is held in the vertical position under the action of the counterweight 5 and the jack 15, which has not been supplied with pressure medium, is in the position 18 owing to the aforesaid offset position of its point of articulation 17.

When the machine which is being fed with blocks by the device has concluded working operations on a block and requires a new block, compressed air is admitted under the piston of the jack 15. The latter is situated at the end of its stroke in the position 19, this stroke being designed so as to cause a rotational movement 20 through 90° towards the left on the part of the arm proper. The transmission of this movement through 90° is indeed rendered possible by the fact that the direction of application of the thrust of the jack at no time passes through the pivotal axis 3, from the position of equilibrium of the arm indicated hereinbefore. It should also be noted that this position of equilibrium does not correspond to a dead centre position of the jack piston, which will be important in a later stage of the operation.

At the end of its stroke 20, the arm, whose jaws 6 have engaged about the waiting block P, bears against a contact-maker 21 which is fast with the frame of the device, the said contact-maker actuating the jack 9 in the sense of closing the jaws (arrows in FIG. 2).

At the conclusion of the travel of the jaws gripping the block, a control finger 22 which is fast with the movable member 11 of the jack 9, comes to bear against a contact-maker 23 which is also fast with the frame, this contact-maker controlling the supply of compressed air to the upper face of the piston of the jack 15, whose chamber under this piston is simultaneously vented.

At the end of stroke of the piston of this jack, that is to say up to its bottom dead centre, the point of articulation 17 on the counterweight is thus brought into vertical alignment with the pivot pin 3 of the arm (position 24 of jack 15). The result is that the arm carrying the block P has undergone a rotation 25 of $-(90°+\text{Å})$, the anlge Å resulting from the amount of offset D of the point of articulation 17 relatively to the longitudinal axis of the arm, and being in this case approximately 15°.

In this position of the arm, inclined towards the right relatively to the vertical, a cam 26 which is adjustable on the counterweight actuates a contact-maker 27 fast with the frame (FIGS. 1 and 2), the said contact-maker bringing about the venting of the chamber of the jack 15, above the piston of course.

Owing to the inclination of the arm towards the right and the weight given to the counterweight, in such manner that the arm-block assembly will preponderate over the said weight, weight carries the arm in rotatational movement towards the right along the path of travel 28, to which the extreme left-hand position 29 of the jack 15 corresponds.

This movement of the arm, coming to place the turned-round cylinder block onto its new support means, must be braked so as to prevent excessive impact when the block arrives at the machine.

For this purpose, the exhaust of the jack is controlled by an appropriate retarding device in the sense corresponding to the upward travel of its piston.

In laying the block down at the end of travel 28, the arm comes to bear against a contact-maker 30 which is fast with the frame of the machine and operates the jack 9 in the sense of opening the jaws 6, and the block P is thus relinquished in the desired position.

From the time the arm relinquishes the block, the said arm is automatically returned to its vertical position of readiness (travel 31) under the action of the counterweight, which has again assumed the preponderating influence. During the corresponding return travel of the piston of the jack 15, from the position 29 to the position 18, it will be noted that the retarding device of the aforesaid type is inoperative, the circulation of air having been reversed.

The present form of embodiment has of course, been given more especially by way of example, and modifications could be conceived which would be within the scope of the invention.

I claim:

1. In an automatic work-handling apparatus for transferring a workpiece from one position to another, in combination, at least one pivotable work-handling arm, a counterweight connected to said arm for constantly biasing the arm toward a ready position corresponding to an upright position of equilibrium, a reciprocably driven rod, first means pivotally connecting the rod to the counterweight at a pivot position, second means pivotally connecting the end of the rod opposite to the pivot connection to the counterweight to a set position, reciprocable means operable to reciprocably drive said rod thereby to oscillate said counterweight and rotate said arm in opposite directions between a terminal first position and a second position intermediate the terminal first position and another terminal position in which said arm is inclined with respect to said upright position, said intermediate position being disposed between said other terminal position of the arm and its upright position and said upright position being disposed between said terminal positions, said reciprocable means having means operable to a terminal dead-center position for positioning the arm in its intermediate position, means connecting the last-mentioned means to said rod, a gripper mechanism on said arm for releasably grasping a workpiece at the terminal first position and releasing it at the other terminal position, means for actuating the gripper mechanism in timed relationship with the rod driving means, and the counterweight being so chosen as to allow the workpiece to assist in moving the arms to said other terminal position thereof when the arms are moved away from said position of equilibrium.

2. In an automatic work-handling apparatus for transferring and simultaneously inverting a workpiece, in combination, at least one pivotable work-handling arm, a counterweight connected to said arm for constantly biasing the arm toward a ready position corresponding to an upright position of equilibrium, said arm having a longitudinal axis, a reciprocably driven rod, first means pivotally connecting the rod to the counterweight at a pivot position, second means pivotally connecting the end of the rod opposite to the pivot connection to the counterweight to a set position, a first jack operable to reciprocably drive said rod thereby to oscillate said counterweight and rotate said arm in opposite directions between a terminal first position and a second position intermediate the terminal first position and another terminal position in which said arm is inclined with respect to said upright position and operable to a terminal dead-center position when said arm is in the intermediate position, said intermediate position being disposed between said other terminal position of the arm and its upright position and said upright position being disposed between said terminal positions, a gripper mechanism on said arm for releasably grasping a workpiece in an upright condition at the terminal first position and releasing it at the other terminal position in an inverted condition, means for actuating the gripper mechanism in timed relationship with the rod driving jack, and the counterweight being so chosen as to allow the workpiece to assist in moving the arms to said other terminal position thereof when the arms are moved away from said position of equilibrium.

3. In an automatic work-handling apparatus for transferring and simultaneously inverting a workpiece, in combination, at least one pivotable work-handling arm, a counterweight connected to said arm for constantly biasing the arm toward a ready position corresponding to an upright position of equilibrium, said arm having a longitudinal axis, a reciprocably driven rod, first means pivotally connecting the rod to the counterweight at a pivot position, second means pivotally connecting the end of the rod opposite to the pivot connection to the counterweight to a set position, reciprocable means operable to reciprocably drive said rod thereby to oscillate said counterweight and rotate said arm in opposite directions between a terminal first position and a second position intermediate the terminal first position and another terminal position in which said arm is inclined with respect to said upright position, said reciprocable means having means operable to a terminal dead-center position for positioning the arm in its intermediate position, means connecting the last-mentioned means to said rod, said intermediate position being diposed between said other terminal position of the arm and its upright position and said upright position being disposed between said terminal positions, a gripper mechanism on said arm for releasably grasping a workpiece in an upright condition at the terminal first position and releasing it at the other terminal position in an inverted condition, means for actuating the gripper mechanism in timed relationship with the rod driving means, and the counterweight being so chosen as to allow the workpiece to assist in moving the arms to said other terminal position thereof when the arms are moved away from said position of equilibrium.

4. In an automatic work-handling apparatus for transferring and simultaneously inverting a workpiece, in combination, at least one pivotable work-handling arm, a counterweight connected to said arm for constantly biasing the arm toward a ready position corresponding to an upright position of equilibrium, a reciprocably driven rod, first means pivotally connecting the rod to the counterweight at a pivot position, second means pivotally connecting the end of the rod opposite to the pivot connection to the counterweight to a set position, a first jack operable to reciprocably drive said rod thereby to oscillate said counterweight and rotate said arm in opposite directions between a terminal first position and a second position intermediate the terminal first position and another terminal position in which said arm is inclined with respect to said upright position and operable to a terminal dead-center position when said arm is in the intermediate position, said intermediate position being disposed between said other terminal position of the arm and its upright position and said upright position being disposed between said terminal positions, a gripper mechanism on said arm for releasably grasping a workpiece in an upright condition at the terminal first position and releasing it at the other terminal position in an inverted condition, means comprising a second jack for operating the gripper mechanism in timed relationship with said first jack for driving said rod, and the counterweight being so chosen as to allow the workpiece to assist in moving the arms to said other terminal position thereof when the arms are moved away from said position of equilibrium.

5. In an automatic work-handling apparatus for transferring and simultaneously inverting a workpiece, in combination, a pair of pivotable work-handling arms, a counterweight connected to said arms for constantly biasing the arms in an unloaded condition toward a ready position corresponding to an upright position of equilibrium, a reciprocably driven rod, first means pivotally connecting the rod to the counterweight at a pivot position, second means pivotally connecting the end of the rod opposite to the pivot connection to the counterweight to a set position, a first jack operable to reciprocably drive said rod thereby to oscillate said counterweight and rotate said arms jointly in opposite directions between a terminal first position and a second position intermediate the terminal first position and another terminal position in which said arms are inclined with respect to said upright position, said jack having a piston operable to a terminal dead center position when said arms are in the intermediate position, said intermediate position being disposed between said other terminal position of the arm and its upright position and said upright position being disposed between said terminal positions, a gripper mechanism on said arm for releasably grasping a workpiece in an upright condition at the terminal first position and releasing it at the other terminal position in an inverted condition, means for actuating the gripper mechanism in timed relationship with said jack for driving said rod, and the counterweight being so chosen as to allow the workpiece to assist in moving the arms to said other terminal position thereof when the arms are moved away from said position of equilibrium.

References Cited in the file of this patent

UNITED STATES PATENTS

| | | |
|---|---|---|
| 2,234,599 | Johnston | Mar. 11, 1941 |
| 2,579,094 | Rooksby | Dec. 18, 1951 |
| 2,643,780 | Rowe | June 30, 1953 |
| 2,651,087 | Fellows | Sept. 8, 1953 |
| 2,758,729 | Van Dusen | Aug. 14, 1956 |
| 2,802,586 | Wingard | Aug. 13, 1957 |
| 2,841,299 | Gildner | July 1, 1958 |